US012810708B2

(12) United States Patent
Huang

(10) Patent No.: US 12,810,708 B2
(45) Date of Patent: Nov. 24, 2026

(54) FIRE EARLY WARNING DEVICE AND FIRE EARLY WARNING METHOD

(71) Applicant: CAR IN INTERNATIONAL CO., LTD., Taipei City (TW)

(72) Inventor: Chi-Liang Huang, Taipei City (TW)

(73) Assignee: CAR IN INTERNATIONAL CO., LTD., Taipei City (TW)

(*) Notice: Subject to any disclaimer, the term of this patent is extended or adjusted under 35 U.S.C. 154(b) by 0 days.

(21) Appl. No.: 18/957,873

(22) Filed: Nov. 25, 2024

(65) Prior Publication Data

US 2026/0105824 A1 Apr. 16, 2026

(30) Foreign Application Priority Data

Oct. 15, 2024 (TW) ................................ 113139141

(51) Int. Cl.
*G08B 17/12* (2006.01)
*G08B 17/00* (2006.01)
*G08B 25/00* (2006.01)

(52) U.S. Cl.
CPC ........... *G08B 17/00* (2013.01); *G08B 25/004* (2013.01)

(58) Field of Classification Search
CPC .............................. G08B 17/00; G08B 25/004
USPC .......................................................... 340/577
See application file for complete search history.

(56) References Cited

U.S. PATENT DOCUMENTS 11,538,321 B2 * 12/2022 Sprakel .................... G01K 7/16
12,384,267 B1 * 8/2025 Kim ....................... A62C 2/247
2014/0152445 A1 * 6/2014 Krieg ...................... B60L 58/21 340/584
2014/0180774 A1 * 6/2014 Rangarajan ........ G06Q 30/0284 705/13
2015/0364944 A1 * 12/2015 Garcia Briz .......... B60L 53/122 307/104
2017/0004709 A1 1/2017 Nordbruch
2023/0002982 A1 * 1/2023 Kim ........................ E01F 9/553
2023/0177957 A1 * 6/2023 Park ...................... B60L 53/305 320/109
2024/0021059 A1 * 1/2024 Pilla ...................... G01J 5/0018

FOREIGN PATENT DOCUMENTS

| | | |
|---|---|---|
| CN | 110533869 A | 12/2019 |
| CN | 110580810 A | 12/2019 |
| CN | 112370702 A | 2/2021 |
| CN | 112370703 A | 2/2021 |

(Continued)

*Primary Examiner* — Tai T Nguyen

(74) *Attorney, Agent, or Firm* — Winston Hsu

(57) ABSTRACT

A fire warning device includes a housing, installed at a parking position where a vehicle is parked; a sensing module, set up within the housing, configured to detect the parking status of the vehicle relative to the parking position; a temperature detection module, set up within the housing, configured to detect temperature and generate a detection result; a processing module, set up within the housing and coupled to the sensing module and the temperature detection module, configured to control the temperature detection module to detect the temperature at a bottom of the vehicle when the parking status indicates that the vehicle is parked in the parking position, and generate an indication signal when the detection result shows that the temperature at the bottom of the vehicle exceeds a threshold value.

16 Claims, 7 Drawing Sheets

(56) References Cited

FOREIGN PATENT DOCUMENTS

| | | | |
|---|---|---|---|
| CN | 113888884 | A | 1/2022 |
| CN | 116726425 | A | 9/2023 |
| CN | 117022017 | A | 11/2023 |
| JP | 2017-78922 | A | 4/2017 |
| JP | 2022-546632 | A | 11/2022 |
| JP | 2022-551004 | A | 12/2022 |
| WO | 2024/113646 | A1 | 6/2024 |

* cited by examiner

FIRE EARLY WARNING DEVICE AND FIRE EARLY WARNING METHOD

BACKGROUND OF THE INVENTION

1. Field of the Invention

The present invention relates to a fire early warning device and fire early warning method, and more particularly, to capable of early warning potential vehicle fire risks.

2. Description of the Prior Art

With the continuous development and popularization of automotive technology, vehicle safety issues have received increasing attention. Among these, vehicle fires represent a particularly serious safety concern, not only threatening the lives of passengers but also potentially causing severe property damage, especially in densely packed parking areas such as parking lots and underground garages, where the consequences of a fire can be even more severe.

In recent years, with the rapid adoption of electric vehicles, vehicle fire issues have presented new challenges. The lithium-ion batteries used in electric vehicles can experience thermal runaway under certain conditions (such as overcharging, over-discharging, mechanical damage, etc.), leading to fires. However, compared to traditional gasoline vehicles, electric vehicle fires burn at higher temperatures, last longer, and are more difficult to extinguish. Moreover, even after the fire appears to be controlled, lithium-ion batteries may reignite due to residual heat, increasing the difficulty of fire suppression.

Generally, existing vehicle fire prevention and detection methods mainly include on-board fire alarms, parking lot smoke alarm systems, and manual inspection. On-board fire alarms are typically installed inside vehicles and determine the occurrence of fires by detecting smoke or temperature anomalies. However, this method can only issue warnings after a fire has already occurred and produced obvious smoke or high temperatures, failing to achieve early warning capabilities, especially for detecting abnormalities in power batteries located at the bottom of electric vehicles in a timely manner. Parking lot smoke alarm systems, currently adopted by most parking facilities, detect fires by installing smoke detectors throughout the parking area. However, this method requires smoke to spread to the detector location before detection is possible, and it struggles to detect early-stage fires at the bottom or inside of vehicles, particularly battery abnormalities, in a timely manner. As for manual inspection, while it can identify abnormal situations promptly, it is labor-intensive, costly, and cannot achieve 24-hour continuous monitoring. Additionally, abnormal temperatures at the bottom of vehicles, especially batteries underneath electric vehicles, are difficult to detect through visual observation alone.

Therefore, there is an urgent need for a vehicle fire early warning system that can detect abnormalities in the early stages of a fire, particularly one that can effectively monitor the undercarriage area. Such a system should be cost-effective and system-integrable while being adaptable to different types of vehicles, especially providing more effective protection for the increasing number of electric vehicles.

SUMMARY OF THE INVENTION

Therefore, the present invention is to provide a fire early warning device and fire early warning method, to achieve early fire risk warning and offer advantages including easy installation, simple maintenance, and high cost-effectiveness.

An embodiment of the present invention discloses a fire warning device, which comprises a housing, installed at a parking position where a vehicle is parked; a sensing module, set up within the housing, configured to detect a parking status of the vehicle relative to the parking position; a temperature detection module, set up within the housing, configured to detect temperature and generate a detection result; and a processing module, set up within the housing and coupled to the sensing module and the temperature detection module, configured to control the temperature detection module to detect the temperature at a bottom of the vehicle when the parking status indicates that the vehicle is parked in the parking position, and generate an indication signal when the detection result shows that the temperature at the bottom of the vehicle exceeds a threshold value.

Another embodiment of the present invention discloses a fire warning method, which comprises detecting temperature at a bottom of a vehicle to generate a detection result when the vehicle is parked in a parking position; and generating an indication signal when the detection result shows that the temperature at the bottom of the vehicle exceeds a threshold value.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, hardware manufacturers may refer to a component by different names. This document does not intend to distinguish between components that differ in name but not function. In the following description and in the claims, the terms "include" and "comprise" are utilized in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
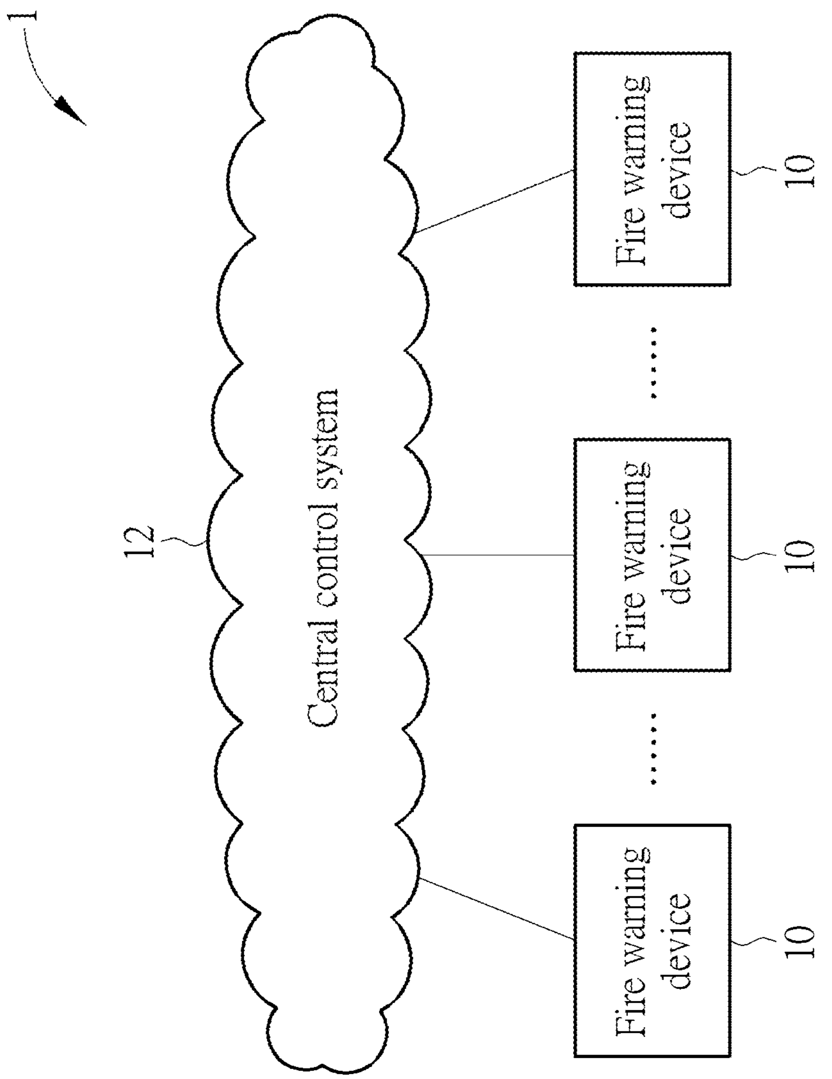
FIG. 1 is a schematic diagram of a disaster monitoring system according to an embodiment of the present invention.

Please refer to FIG. 1, which shows a schematic diagram of a disaster monitoring system 1 according to an embodiment of the present invention. The disaster monitoring system 1 includes a plurality of fire warning devices 10 and a central control system 12. Each fire warning device 10 is installed at a parking position, for example, buried beneath the parking position, capable of detecting the bottom temperature of a vehicle parked above it, and communicates with the central control system 12 through wired or wireless means to achieve early fire risk warning. It should be noted that the installation of the fire warning device 10 is not limited to burial methods; any installation method that can securely fix the fire warning device 10 at the parking position is applicable to the present invention.

Figure 2:
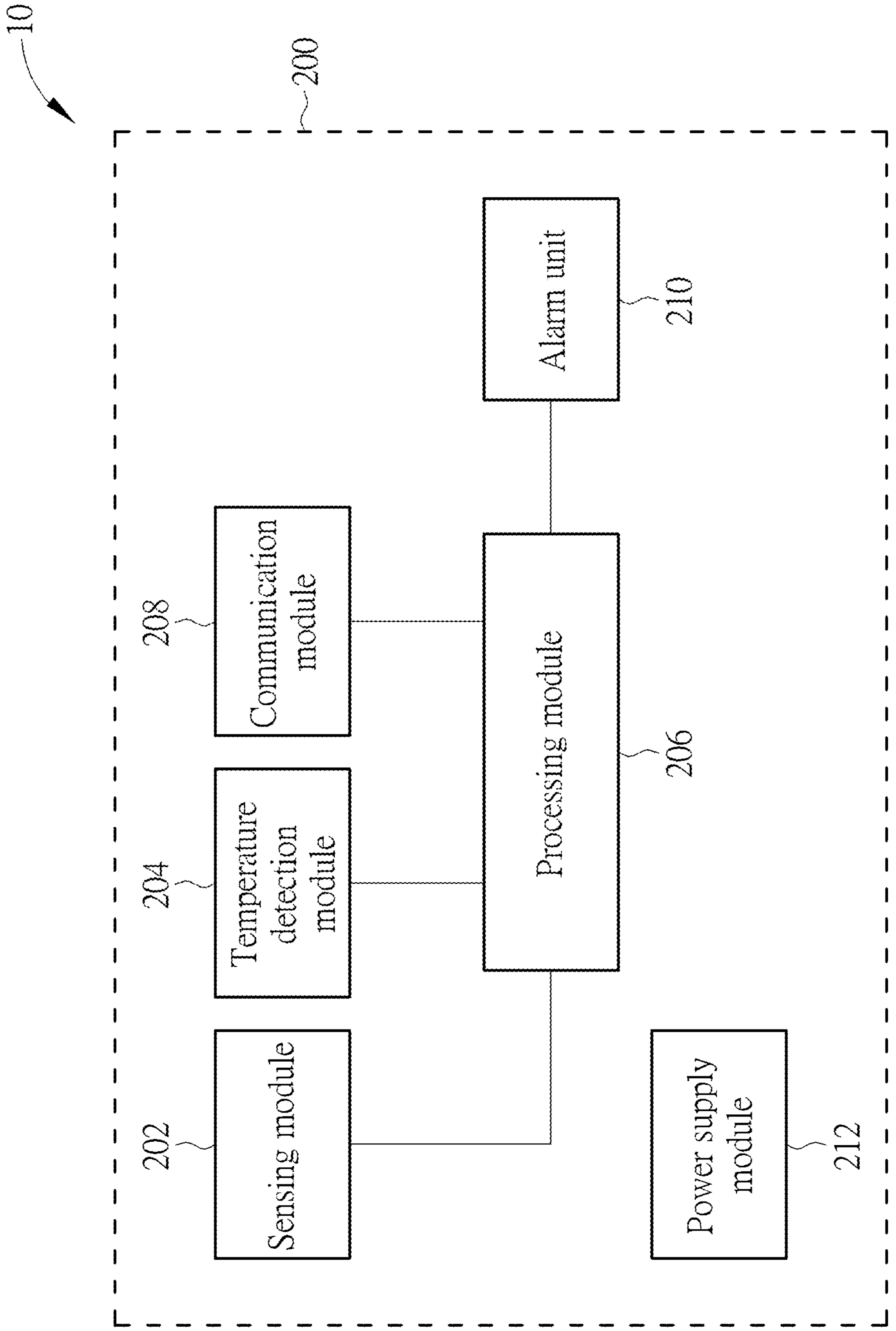
FIG. 2 is a schematic diagram of a fire warning device according to an embodiment of the present invention.

Specifically, please continue to refer to FIG. 2, which shows a schematic diagram of any one of the fire warning devices 10 shown in FIG. 1. The fire warning device 10 includes a housing 200, a sensing module 202, a temperature detection module 204, a processing module 206, a communication module 208, an alarm unit 210, and a power supply module 212. The housing 200 is used to house and protect other components and can be installed at the parking position, such as buried beneath the ground surface of the parking position. The sensing module 202 is set up within the housing 200 and coupled to the processing module 206, used to detect the parking status at the parking position. The temperature detection module 204 is set up within the housing 200 and coupled to the processing module 206, used to detect temperature and generate a detection result. The processing module 206 is set up within the housing and coupled to other modules, used to control the temperature detection module 204 to detect the bottom temperature of the vehicle when the parking status detected by the sensing module 202 indicates that a vehicle is parked in the parking position, and generate an indication signal when the detection result from the temperature detection module 204 shows that the bottom temperature of the vehicle exceeds a threshold value. The communication module 208 is set up within the housing 200 and coupled to the processing module 206, used to transmit the detection result from the temperature detection module 204 or the indication signal from the sensing module 202 to the central control system 12. The alarm unit 210 is coupled to the processing module 206, used to receive the indication signal from the processing module 206 to issue an alarm signal, such as one or more of sound, light, or mobile phone push notifications. The power supply module 212 is set up within the housing 200, used to supply power to the fire warning device 10.

In brief, the fire warning device 10 can be buried beneath the ground surface of the parking position, and when a vehicle is parked above it, it can detect the bottom temperature of the vehicle to determine if there is a fire risk, and can further transmit relevant information back to the central control system 12. As such, the embodiment of the present invention can provide appropriate warnings at the initial stages of potential vehicle fires, allowing relevant personnel to respond early, prevent more serious fires, or take precautionary measures such as evacuation and warnings to prevent greater damage. It should be noted that the fire warning device 10 shown in FIG. 2 is an embodiment of the present invention, and those skilled in the art may make various modifications without being limited to this configuration. For example, modules in the fire warning device 10 can be added, removed, or replaced according to actual needs. In some embodiments, the alarm unit 210 can be omitted, relying solely on the central control system 12 to issue alarms; or the communication module 208 can be omitted, relying solely on the alarm unit 210 to issue alarm signals. Additionally, in some embodiments, the sensing module 202 can also be omitted, meaning the fire warning device 10 does not need to detect whether a vehicle is parked in the parking position, but directly uses the temperature detection module 204 to detect the bottom temperature of vehicles.

In one embodiment, the housing 200 may include an upper housing and a lower housing. The lower housing is buried within the parking position, while the upper housing can be fitted to the lower housing and protrudes slightly above the parking position. Additionally, the upper housing may include a transparent or semi-transparent portion to allow sensing by the sensing module 202 and the temperature detection module 204. Preferably, the housing 200 possesses waterproof, dustproof, and pressure-resistant characteristics to ensure internal components can operate normally under adverse conditions. For example, the applicant of the present invention has provided sensing devices capable of detecting parking conditions in TW Patent Application No. 112208804 and No. 112212707, which adopt an upper and lower housing combined structure that can be appropriately modified and applied to the embodiment of the present invention for use in parking environments.

In one embodiment, the sensing module 202 can be one or more combinations of an infrared sensor, magnetic sensor, millimeter-wave sensor, or camera lens, but is not limited to these options. Any module or component capable of accurately detecting whether a vehicle is parked in the parking position is suitable for implementing the sensing module 202. Furthermore, to increase detection accuracy, the number of sensors in the sensing module 202 is not limited to one; a plurality of sensors or redundant designs can be employed to enhance accuracy. Moreover, if the fire warning device 10 of the embodiment is integrated into a smart parking management system, such as integration with the architecture of TW Patent Application No. 112208804 and No. 112212707, the sensing module 202 can also be used to detect environmental information of the parking position, enabling the processing module 206 to determine vehicle entry, parking stabilization, exit times, and handle image capture upload and recording functions. Specifically, in one embodiment, the sensing module 202 may include one or more of an ultrasonic unit, a millimeter-wave radar detection unit, an image capture unit, and a light supplementation component. The ultrasonic unit can detect objects within a specific range (such as 5 meters) through ultrasonic detection, thereby determining vehicle entry, parking stabilization, and exit. The millimeter-wave radar detection unit uses millimeter-wave radar detection to improve the accuracy of vehicle entry and exit determination while filtering out interference from non-motorized vehicles, pedestrians, and other objects. The image capture unit can collect real-time images, capture vehicle entry and exit status images, and photograph the parking position at specific intervals (such as every 10 minutes) when a vehicle is parked, to meet regulatory requirements. The light supplementation component is used for flash supplementation to ensure clear nighttime images, reduce image noise, and overcome adverse conditions caused by license plate reflection. As such, the processing module 206 can determine the parking status of the parking position and report back to the central management center of the smart parking management system (which can be integrated with the central control system 12).

In another embodiment, the sensing module 202 may include a plurality of sensors, where when one sensor's detection result indicates a change in the parking status of the parking position, at least another sensor is activated for detection, and the detection results from at least the other sensor are sent to the smart parking management system. In other words, the sensing module 202 can also implement a two-stage detection mechanism. The first stage is the trigger stage, where one sensor detects environmental information of the parking position, and when its detection result indicates a change in parking status, it proceeds to the second stage. The second stage is the inspection stage, where at least another sensor performs detection and transmits its detection results to the smart parking management system. This effectively eliminates error signals caused by sensing technology limitations, allowing the management end of the smart parking management system to correctly determine vehicle entry, parking stabilization, and exit times, thereby conducting parking ticketing, fee collection, and other management tasks, avoiding unnecessary disputes, and achieving the goals of unmanned management and smart fee collection.

The detailed implementation of integrating the fire warning device 10 into the smart parking management system described above should be appropriately derivable by those skilled in the art with reference to TW Patent Application No. 112208804 and No. 112212707, and will not be elaborated further here.

In one embodiment, the temperature detection module 204 can be one or more of an infrared sensor, thermocouple, thermistor, or resistance temperature detector, but is not limited to these options. Similarly, to increase detection accuracy, the number of detectors in the temperature detection module 204 is not limited to one; multiple or redundant designs can be employed to enhance accuracy, meaning the temperature detection module 204 can detect over a wide area or a plurality of points, but is not limited to these configurations.

In one embodiment, the communication module 208 can be one or more of a Bluetooth module, WiFi module, telecommunication signal module, or wired network module, but is not limited to these options. Any module or component that enables the processing module 206 to exchange data with the central control system 12 is suitable for implementing the communication module 208.

Moreover, the power supply module 212 can include one or more of batteries, solar panels, wireless charging receivers, and mains power conversion modules, but is not limited to these. Additionally, the power supply module 212 is preferably designed for easy maintenance and replacement to ensure long-term stable operation of the device and reduce maintenance costs.

On the other hand, the operating logic of the processing module 206 can be appropriately adjusted according to system or application scenario requirements. For example, when the parking status indicates the vehicle is parked (either just parked or after being parked for some time), the processing module 206 can control the temperature detection module 204 to continuously monitor temperature. As the vehicle cools down after being turned off, the temperature should gradually decrease; therefore, if the temperature continues to rise after the vehicle is parked, a corresponding indication signal can be generated. In other words, the processing module 206 may generate an indication signal only when the vehicle has been parked in the parking space for longer than a preset time (such as 15 minutes) and the detection results show the bottom temperature of the vehicle exceeds the threshold. This can reduce false alarms caused by temporary parking or residual engine heat from recently parked vehicles. Furthermore, the processing module 206 can employ a plurality of strategies when determining if the bottom temperature of the vehicle is abnormal to improve accuracy and reduce false alarms. Specifically, the processing module 206 can consider both absolute temperature values and temperature change rates. For example, regarding absolute temperature values, the processing module 206 can compare the actual temperature measured by the temperature detection module 204 with a preset safety threshold (e.g., 80 °C). If the actual temperature exceeds this threshold, it is considered abnormal. On the other hand, to avoid interference from environmental temperature changes (such as direct sunlight or cold weather) affecting judgment, the processing module 206 can also calculate the rate of temperature change. Specifically, the processing module 206 can continuously record temperature data for a period (such as 15 minutes) after the vehicle is parked and calculate the rate of temperature change. If the temperature rise rate exceeds a preset threshold (such as 1 °C per minute), it will be considered a potential abnormal situation even if the absolute temperature has not reached the warning level. Additionally, the processing module 206 can compare the measured bottom temperature with the surrounding ambient temperature. If the temperature difference between the measured bottom temperature and the surrounding ambient temperature exceeds a certain threshold (such as 20 °C), it will also be considered abnormal. These multiple judgment mechanisms aim to enable the fire warning device 10 to more accurately identify potential vehicle fire risks while effectively reducing false alarms due to environmental factors, but are not limited to these.

Furthermore, when generating indication signals, the processing module 206 can include not only temperature anomaly information but also identification information of the corresponding fire warning device 10, such as the device's MAC address, IP address, or pre-configured device ID. When the central control system 12 receives an indication signal, it can immediately locate the specific parking position. For example, the central control system 12 can maintain a lookup table that associates identification information of each fire warning device 10 with its actual installation location. This location information can include the road section where the parking space is located, address, parking lot floor and zone numbers, or even specific parking space numbers. Accordingly, for roadside parking spaces or large parking lots, this positioning function can help management or rescue personnel quickly find vehicles that might be experiencing problems and take timely response measures. Additionally, if the central control system 12 supports an electronic map system, this location information can be directly marked on the map to further improve response time.

Moreover, in FIG. 2, while the alarm unit 210 is shown within the housing 200, in other embodiments, the alarm unit 210 could also be an alarm device located outside the housing 200, receiving indication signals from the processing module 206 via wired or wireless connections to issue alarm signals. Furthermore, when the alarm unit 210 needs to send mobile push notifications as alarm signals, it should work with the communication module 208 to send them to cloud services or local servers. The notification scope may include devices capable of receiving these alerts such as mobile phones, fire reporting devices, central control computers, tablets, etc., and the system can send notifications to a plurality of recipients based on different situations. For example, if the parking area is equipped with a license plate recognition system connected to a vehicle owner information database, the central control system 12 can directly send mobile push notifications to the registered owner of the vehicle, including warnings about potential fire risks and specific location information of the vehicle. Secondly, whether or not the owner can be contacted, the central control system 12 can send notifications to the parking management center, allowing relevant staff to quickly arrive at the scene for preliminary inspection and necessary preventive measures. If the alarm status remains unresolved after a certain period, the central control system 12 can automatically notify local fire departments, including information such as the exact address of the parking lot, location of the potentially burning vehicle, nearest fire access routes, etc., to help firefighters plan rescue operations more effectively. Through this multi-level notification mechanism, the present invention can maximize the reduction of losses caused by vehicle fires while ensuring all relevant units receive timely information and take appropriate action.

It should be noted that in the above embodiments, parking positions broadly refer to traffic facilities used for parking or stopping vehicles, which are related to the vehicles being served. In one embodiment, if the vehicle is a drone, the parking position can be appropriately substituted with a drone platform. In another embodiment, if the vehicle is a shared electric bicycle, the parking position can be appropriately substituted with a fixing stand for the electric bicycle. Such appropriate derivative variations based on different types of vehicles should be considered within the common skill of those skilled in the art.

Furthermore, the fire warning device 10 of the invention can be widely applied to various parking scenarios, such as indoor parking lots, outdoor parking lots, and roadside parking spaces. By installing the fire warning device 10 at each parking space and connecting them to the central control system 12, the disaster monitoring system 1 can be implemented to establish a comprehensive vehicle fire warning network, which not only enhances parking lot safety but also provides additional peace of mind for vehicle owners.

Figure 3A:
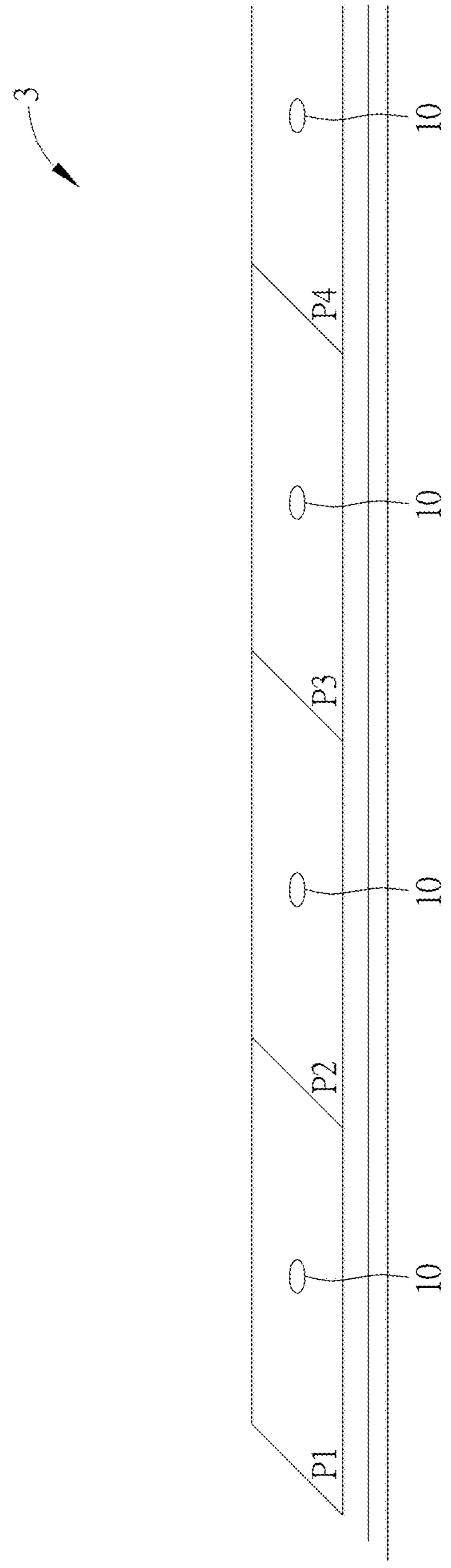
FIG. 3A and FIG. 3B are schematic diagrams of a roadside parking areas.
Figure 3B:
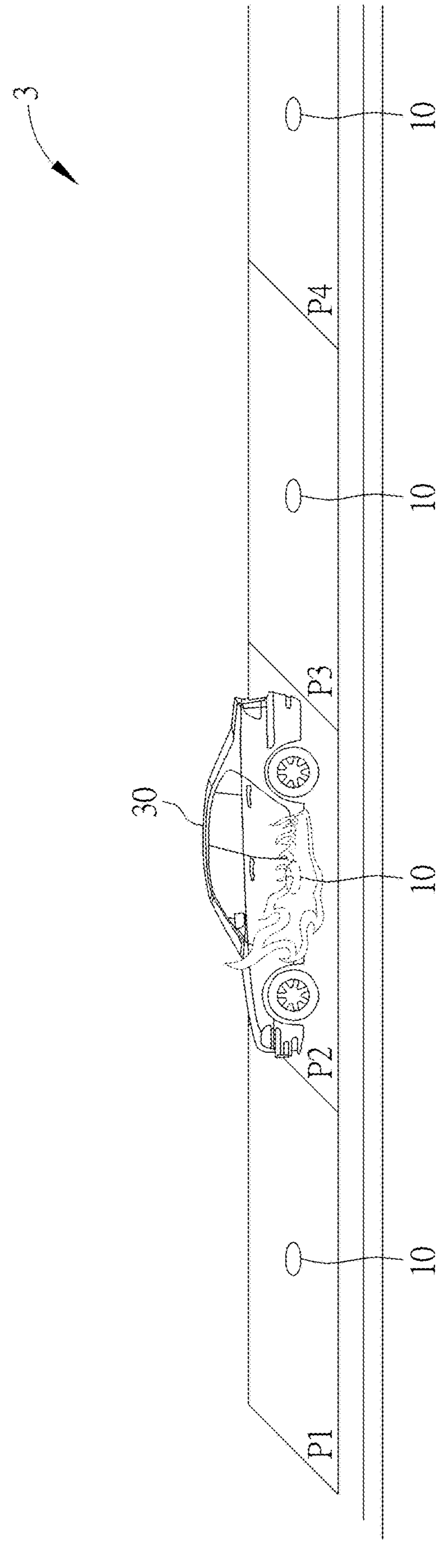

For example, FIG. 3A shows a schematic diagram of a roadside parking area 3. For simplicity, FIG. 3A shows parking spaces P1-P4 in the roadside parking area 3, with each parking space having an embedded fire warning device 10 that can connect to the central control system 12 either wirelessly or via wired connection. As shown in FIG. 3B, when a vehicle 30 enters the parking space P2, the sensing module 202 of the fire warning device 10 in the parking space P2 can detect that the vehicle 30 is stopped in the parking space P2 and transmit the detected parking status to the processing module 206. The processing module 206 can immediately, or after the vehicle 30 has been parked in the parking space P2 for a period, control the temperature detection module 204 to detect the bottom temperature of the vehicle 30. At this time, if the detection results from the temperature detection module 204 show that the bottom temperature of the vehicle 30 exceeds a threshold, for example if its absolute temperature value exceeds the preset safety threshold or the temperature rise rate exceeds the preset threshold, the processing module 206 can generate an indication signal and transmit it to the central control system 12 via the communication module 208, or issue an alarm signal via the alarm unit 210. The indication signal transmitted to the central control system 12 can include identification information identifying the parking space P2, allowing relevant personnel to take appropriate action early; if the alarm unit 210 issues mobile push notifications as alarm signals, notifications can be sent to a plurality of recipients such as vehicle owners, parking management center, fire departments, etc. In this situation, relevant personnel can take action at the first sign of fire, preventing more serious fires or taking preemptive evacuation and warning measures to prevent greater damage.

Figure 4A:
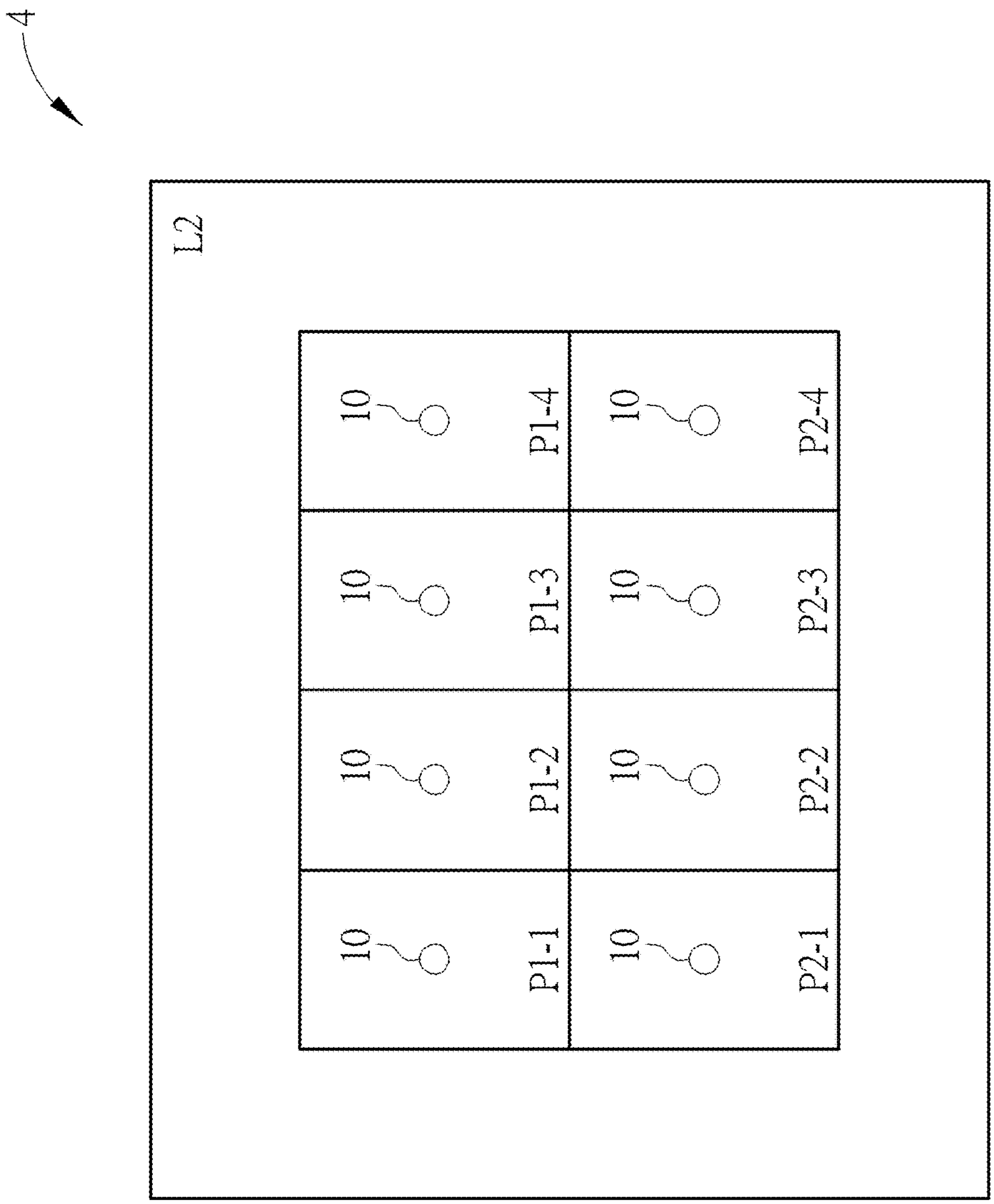
FIG. 4A and FIG. 4B are schematic diagrams of a multi-story parking structure.
Figure 4B:
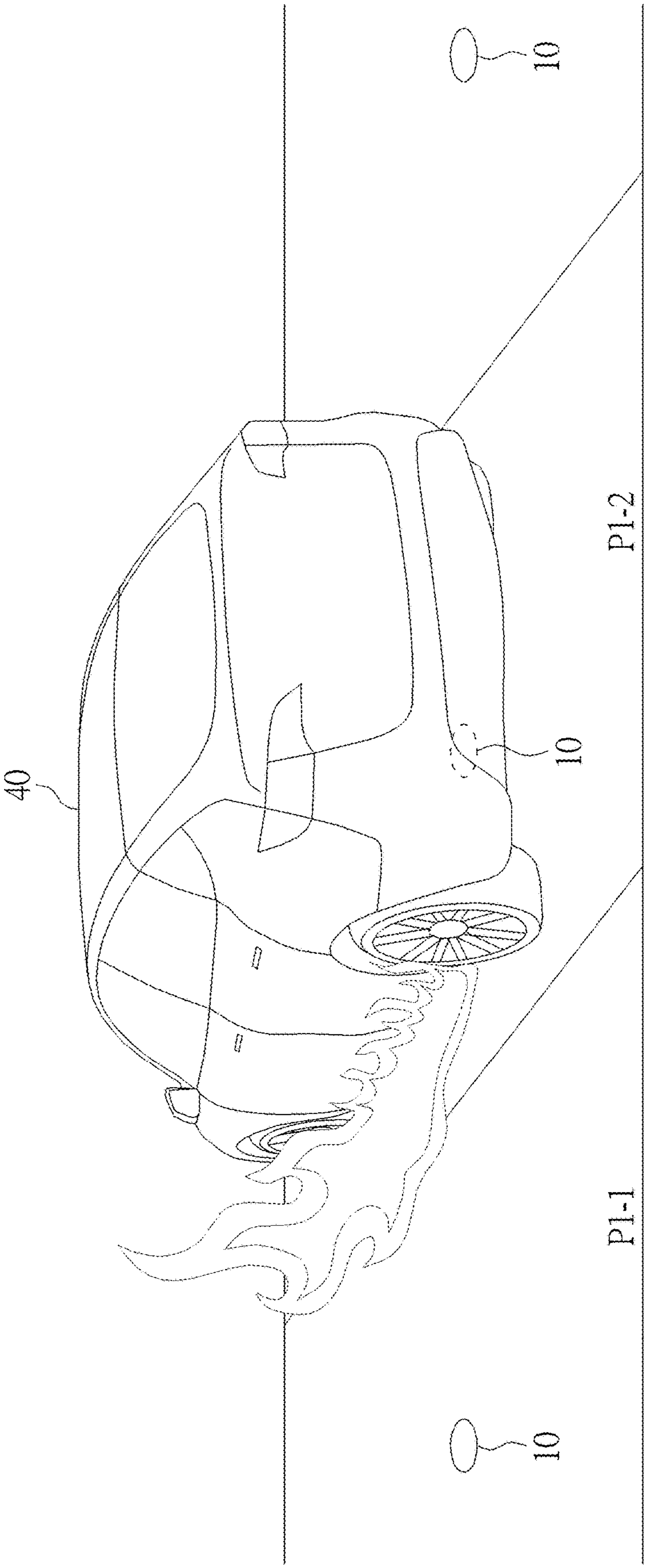

FIG. 4A shows a schematic diagram of a multi-story parking structure 4. For simplicity, FIG. 4A shows parking spaces P1-1 to P1-4 and P2-1 to P2-4 on a floor L2 of the multi-story parking structure 4, with each parking space having an embedded fire warning device 10 that can connect to the central control system 12 either wirelessly or via wired connection. As shown in FIG. 4B, when a vehicle 40 enters the parking space P1-2, the sensing module 202 of the fire warning device 10 in the parking space P1-2 can detect that the vehicle 40 is stopped in the parking space P1-2 and transmit the detected parking status to the processing module 206. The processing module 206 can immediately, or after vehicle 40 has been parked in the parking space P1-2 for a period, control the temperature detection module 204 to detect the bottom temperature of the vehicle 40. At this time, if the detection results from temperature detection module 204 show that the bottom temperature of the vehicle 40 exceeds a threshold, for example if its absolute temperature value exceeds the preset safety threshold or the temperature rise rate exceeds the preset threshold, the processing module 206 can generate an indication signal and transmit it to the central control system 12 via the communication module 208, or issue an alarm signal via the alarm unit 210. The indication signal transmitted to the central control system 12 can include identification information identifying the parking space P1-2, such as "L2, P1-2", allowing relevant personnel to take appropriate action early; if the alarm unit 210 issues mobile push notifications as alarm signals, notifications can be sent to a plurality of recipients such as vehicle owners, parking management center, fire departments, etc. In this situation, relevant personnel can take action at the first sign of fire, preventing more serious fires or taking preemptive evacuation and warning measures to prevent greater damage.

Figure 5:
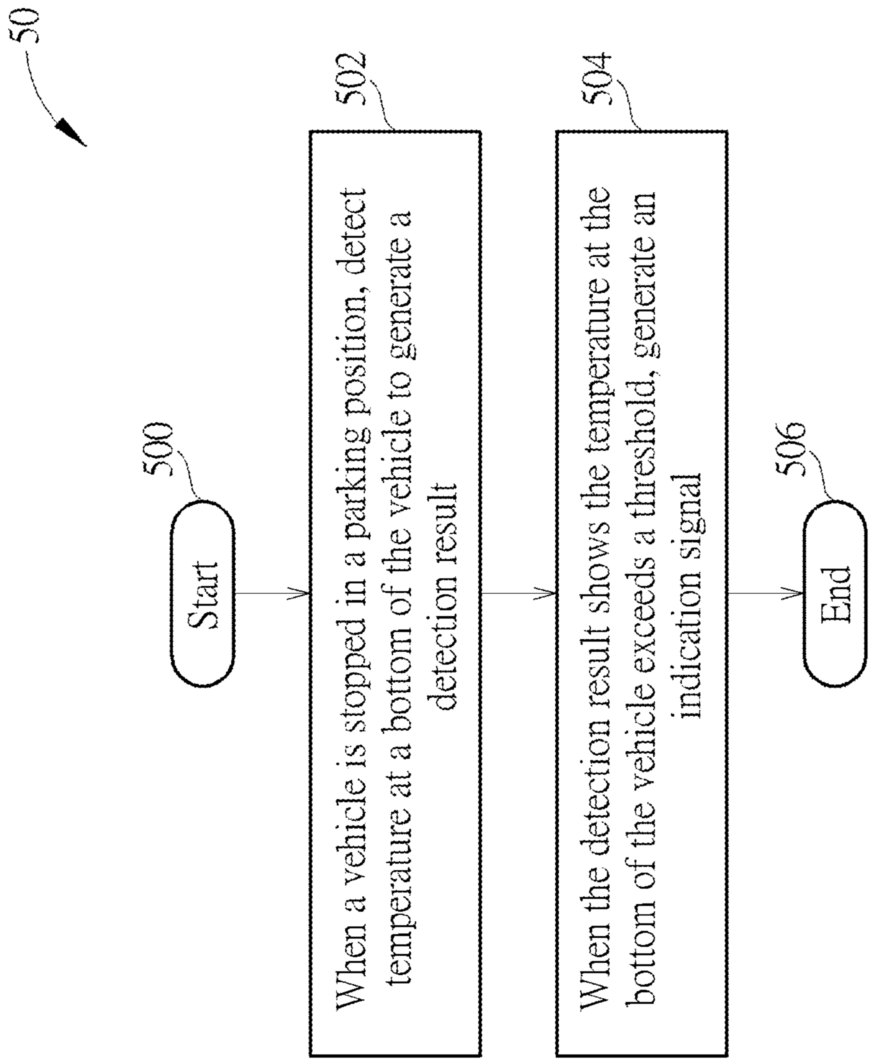
FIG. 5 is a schematic diagram of a fire warning process according to an embodiment of the present invention.

The above-described operation of the fire warning device 10 can be summarized as a fire warning process 50, as shown in FIG. 5. The fire warning process 50 includes the following steps:

Step 500: Start.

Step 502: When a vehicle is stopped in a parking position, detect temperature at a bottom of the vehicle to generate a detection result.

Step 504: When the detection result shows the temperature at the bottom of the vehicle exceeds a threshold, generate an indication signal.

Step 506: End.

For detailed operation and variations of the fire warning process 50, please refer to the previous descriptions, which will not be repeated here.

In conclusion, the present invention provides an efficient and reliable fire warning system, suitable for but not limited to new energy vehicles such as electric vehicles. Through monitoring bottom temperature, it achieves early fire risk warning and offers advantages including easy installation, simple maintenance, and high cost-effectiveness.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A fire warning device, comprising:

a housing, installed at a parking position where a vehicle is parked, wherein the housing comprises an upper housing and a lower housing, the lower housing is buried below a ground surface of the parking position, and the upper housing is fitted to the lower housing and protruding above the ground surface of the parking position;

a sensing module, set up within the housing, configured to detect a parking status of the vehicle relative to the parking position;

a temperature detection module, set up within the housing, configured to detect temperature and generate a detection result; and a processing module, set up within the housing and coupled to the sensing module and the temperature detection module, configured to control the temperature detection module to detect the temperature at a bottom of the vehicle only when the parking status indicates that the vehicle is parked in the parking position, and generate an indication signal when the vehicle has been parked in the parking position for longer than a preset time and the detection result shows that the temperature at the bottom of the vehicle exceeds a threshold value or a temperature change rate exceeds a preset value.

2. The fire warning device according to claim 1, wherein the sensing module is selected from one or more of an infrared sensor, a magnetic sensor, a millimeter-wave sensor, and a camera lens.

3. The fire warning device according to claim 1, wherein the temperature detection module is selected from one or more of an infrared sensor, a thermocouple, a thermistor, and a resistance temperature detector.

4. The fire warning device according to claim 1, further comprising a communication module, set up within the housing and coupled to the processing module, configured to transmit the detection result or the indication signal to a central control system.

5. The fire warning device according to claim 4, wherein the communication module is selected from one or more of a Bluetooth module, a WiFi module, a telecommunication signal module, and a wired network module.

6. The fire warning device according to claim 1, further comprising a power supply module, set up within the housing, configured to supply power to the fire warning device.

7. The fire warning device according to claim 6, wherein the power supply module comprises one or more of a battery, a solar panel, a wireless charging receiver, and a mains power conversion module.

8. The fire warning device according to claim 1, wherein the housing has waterproof, dustproof, and pressure-resistant characteristics.

9. The fire warning device according to claim 1, further comprising an alarm unit coupled to the processing module, configured to receive the indication signal to issue an alarm signal, wherein the alarm signal is selected from one or more of a sound, a light, and a mobile phone push notification.

10. A fire warning method, comprising:

detecting, by a fire warning device, temperature at a bottom of a vehicle to generate a detection result only when the vehicle is parked in a parking position; and generating, by the fire warning device, an indication signal when the vehicle has been parked in the parking position for longer than a preset time and the detection result shows the that temperature at the bottom of the vehicle exceeds a threshold value or a temperature change rate exceeds a preset value;

wherein a housing of the fire warning device comprises an upper housing and a lower housing, the lower housing is buried below a ground surface of the parking position, and the upper housing is fitted to the lower housing and protruding above the ground surface of the parking position.

11. The fire warning method according to claim 10, further comprising detecting the vehicle parked in the parking position through one or more of an infrared sensor, a magnetic sensor, a millimeter-wave sensor, and a camera lens.

12. The fire warning method according to claim 10, wherein detecting the temperature at the bottom of the vehicle is through one or more of an infrared sensor, a thermocouple, a thermistor, and a resistance temperature detector.

13. The fire warning method according to claim 10, further comprising transmitting the detection result or the indication signal to a central control system.

14. The fire warning method according to claim 13, wherein transmitting the detection result or the indication signal to the central control system is through one or more of a Bluetooth module, a WiFi module, a telecommunication signal module, and a wired network module.

15. The fire warning method according to claim 10, further comprising providing power through one or more of a battery, a solar panel, a wireless charging receiver, and a mains power conversion module.

16. The fire warning method according to claim 10, further comprising issuing an alarm signal based on the indication signal, wherein the alarm signal is selected from one or more of a sound, a light, and a mobile phone push notification.

* * * * *